(12) United States Patent
Thiele

(10) Patent No.: US 6,367,821 B2
(45) Date of Patent: Apr. 9, 2002

(54) CAR SEAT AND STROLLER ASSEMBLY

(76) Inventor: Donald J. Thiele, 60 Jackson Rd., Brewster, MA (US) 02631

( * ) Notice: Subject to any disclaimer, the term of this patent is extended or adjusted under 35 U.S.C. 154(b) by 0 days.

(21) Appl. No.: 09/819,829

(22) Filed: Mar. 28, 2001

Related U.S. Application Data

(62) Division of application No. 09/248,443, filed on Feb. 11, 1999.

(51) Int. Cl.⁷ .................................................. B62B 1/99
(52) U.S. Cl. .................. 280/30; 280/47.25; 280/47.38; 280/642; 280/645; 280/658
(58) Field of Search .............................. 280/645, 38, 40, 280/658, 47.25, 647, 643, 648, 47.4, 652, 642, 47.18, 47.38, 42, 650, 30; 297/6; 188/5

(56) References Cited

U.S. PATENT DOCUMENTS

| | | | | |
|---|---|---|---|---|
| 4,874,182 A | * | 10/1989 | Clark | 280/30 |
| 4,878,680 A | * | 11/1989 | Molnar | 280/30 |
| 4,902,026 A | * | 2/1990 | Maldonado | 280/30 |
| 4,989,888 A | * | 2/1991 | Qureshi et al. | 280/30 |
| 5,022,669 A | * | 6/1991 | Johnson | 280/30 |
| 5,104,134 A | * | 4/1992 | Cone | 280/30 |
| 5,318,311 A | * | 6/1994 | Bofill | 280/30 |
| 5,383,585 A | * | 1/1995 | Weiss | 224/415 |
| 5,468,014 A | * | 11/1995 | Gimbel et al. | 280/735 |
| 5,964,470 A | * | 10/1999 | Syendsen et al. | 280/30 |

* cited by examiner

*Primary Examiner*—J. J. Swann
*Assistant Examiner*—James S. McClellan

(57) ABSTRACT

A car seat stroller assembly is provided which can be converted from a child car seat into a child stroller, and vice versa. The car seat stroller assembly comprises a child car seat which can be removably secured to a fixed car seat of an automobile, a wheel assembly secured to the seat body at a location near the rear end of the bottom portion of the seat body, and a handle assembly secured to the seat body at a location along the back portion of the seat body. The car seat stroller assembly preferably consists of two wheels which are rotatably mounted to an axle of the wheel assembly. The wheel assembly can be placed in a retracted position to enable a user to secure the car seat stroller assembly to the fixed car seat of the automobile, or in an extended position in which the wheels extend below the bottom portion of the seat body to enable the car seat stroller assembly to be operated as a child stroller. As a result of the wheel assembly being mounted at a location near the rear end of the bottom portion of the seat body, the car seat stroller assembly is highly maneuverable when it is being operated in the stroller mode.

5 Claims, 5 Drawing Sheets

CAR SEAT AND STROLLER ASSEMBLY

This application is a division of Ser. No. 09/248,443 filed Feb. 11, 1999.

TECHNICAL FIELD OF THE INVENTION

The present invention relates generally to a car seat for infants and toddlers and, more particularly, to a car seat for infants and toddlers which is convertible into a stroller and vice versa.

BACKGROUND OF THE INVENTION

Car seats which convert into strollers, and vice versa, are generally known in the art. These convertible car seats typically have a retractable wheel assembly comprising four wheels which can be retracted so that the stroller converts into a car seat which can be secured to the fixed car seats of an automobile. In order to convert this type of car seat into a stroller, the seat is unfastened from the fixed car seat of the automobile and the wheel assembly is deployed so that the car seat functions as a baby stroller when the wheels are deployed. One disadvantage of the typical car seat which converts into a stroller, and vice versa, is that the wheel assembly usually adds a relatively large amount of weight to the seat thereby rendering the seat somewhat unwieldy and difficult to attach it to and remove it from the fixed car seat of the automobile. The weight of the wheel assembly is generally attributable to the fact that the wheel assembly comprises four wheels and associated hardware.

Batten, U.S. Pat. No. 5,595,393, issued Jan. 21, 1997, discloses an infant car seat stroller which can be converted from a car seat into a stroller, and vice versa. This patent discloses that the car seat comprises a first set of wheels which are attached to a flat bar bracket which, in turn, is affixed to a bottom portion of the seat. The patent discloses that the seat includes a retractable pivoting support on the bottom thereof which is modified by drilling a hole through it and by inserting an axle on which a secondary set of wheels is mounted. This allows the second set of wheels to be retracted so that only the first set of wheels is utilized.

This secondary set of wheels disclosed by Batten corresponds to the back wheels of the car seat. This secondary set of wheels can be retracted to allow the car seat stroller to be pulled across the ground using only the front wheels. One of the primary disadvantages of this design is that it only allows the stroller to be pulled in a rearward direction because pushing the stroller with only front wheels would be very awkward and impractical. This design also requires that the user bear most of the weight of the unit and the infant or toddler while lifting up on the handle since there are no wheels to provide vertical support in the two-wheel drive mode. Also, it appears from the text of this patent that the design is only intended to be used with infants, which typically corresponds to children under the weight of 20 lbs.

Accordingly, a need exists for a car seat which is convertible into a stroller, and vice versa, which overcomes the weight disadvantages of the four-wheel convertible car seat strollers by utilizing only two wheels, and which overcomes the disadvantages of the known two-wheel strollers associated with the lack of vertical support for the unit and child when the stroller utilizes only two wheels.

SUMMARY OF THE INVENTION

The present invention provides a car seat stroller assembly which can be converted from a child car seat into a child stroller, and vice versa. The car seat stroller assembly comprises a child car seat which can be removably secured to a fixed car seat of an automobile, a wheel assembly secured to the seat body at a location near the rear end of the bottom portion of the seat body, and a handle assembly secured to the seat body at a location along the back portion of the seat body.

The car seat stroller assembly preferably consists of two wheels which are rotatably mounted to an axle of the wheel assembly. The wheel assembly can be placed in a retracted position to enable a user to secure the car seat stroller assembly to the fixed car seat of the automobile, or in an extended position in which the wheels extend below the bottom portion of the seat body to enable the car seat stroller assembly to be operated as a child stroller.

In accordance with a first embodiment of the present invention, the car seat stroller assembly utilizes a child car seat which is currently available on the market. The child car seat is retrofitted with the wheel and handle assemblies of the present invention. One child car seat which is suitable for this purpose is sold by Century Products Company. This seat body of the child car seat is retrofitted by attaching the wheel assembly to a protruding portion of the seat body. This protruding portion, which is known as the "Posilock" feature of the car seat, protrudes from the seat body at a location near the rear end of the bottom portion of the seat body and near the bottom end of the back portion of the seat body.

The protruding portion of the child car seat is secured to the seat body in a hinging relationship to allow the protruding portion to be retracted and extended. In the extended position, the protruding portion is normally inserted in between the back and bottom cushions of a fixed automobile car seat to assist in securing the child car seat in place in the automobile. The protruding portion can be retracted to allow a user, e.g., a parent, to easily handle the child car seat when it is being removed from and inserted into the automobile. By attaching the wheel assembly to this existing feature on the car seat, the wheel assembly can be easily extended and retracted by extending and retracting the protruding portion of the child car seat.

Preferably, the front end of the bottom portion of the seat body has a braking mechanism thereon which substantially prevents the car seat stroller assembly from moving when the braking mechanism is in contact with the floor or the ground.

In accordance with a second embodiment of the present invention, the wheel assembly can be suitably attached to any child car seat, including, but not limited to the above-mentioned Century Products Company child car seat. In accordance with this embodiment, the wheel assembly comprises two side members which are transverse to the axle of the wheel assembly. Each side member has a first end, a second end, a first side and a second side. The first ends of the side members are attached to the axle of the wheel assembly.

In accordance with this embodiment, when the wheel assembly is placed in the extended position, a first notch formed in each of the second ends of the side members engages a respective pin secured to sides of the seat body. This prevents the wheel assembly from movement in a direction toward the wheels and in a direction away from the bottom end of the back portion. When the wheel assembly is placed in the retracted position, a notch formed in each of the first sides of the side members engages those same pins. This prevents the wheel assembly from movement in a direction away from the back portion of the seat body.

In accordance with another embodiment of the present invention, which is the preferred embodiment for the wheel and handle assemblies, the handle assembly is linked to the wheel assembly by a linkage in such a way that when the handle assembly is extended, the wheel assembly is extended until the pins secured to the sides of the seat body are engaged in the first notches formed in the ends of the side members. When a user lifts the seat body in an upwards direction away from the wheels, the pins are removed from the notches formed in the ends of the side members. When the handle assembly is retracted, the linkage causes the wheel assembly to be retracted until the pins are engaged in the notches formed in the sides of the side members.

Other features and advantages of the present invention will become apparent from the following description, drawings and claims.

DETAILED DESCRIPTION OF THE INVENTION

Figure 1:
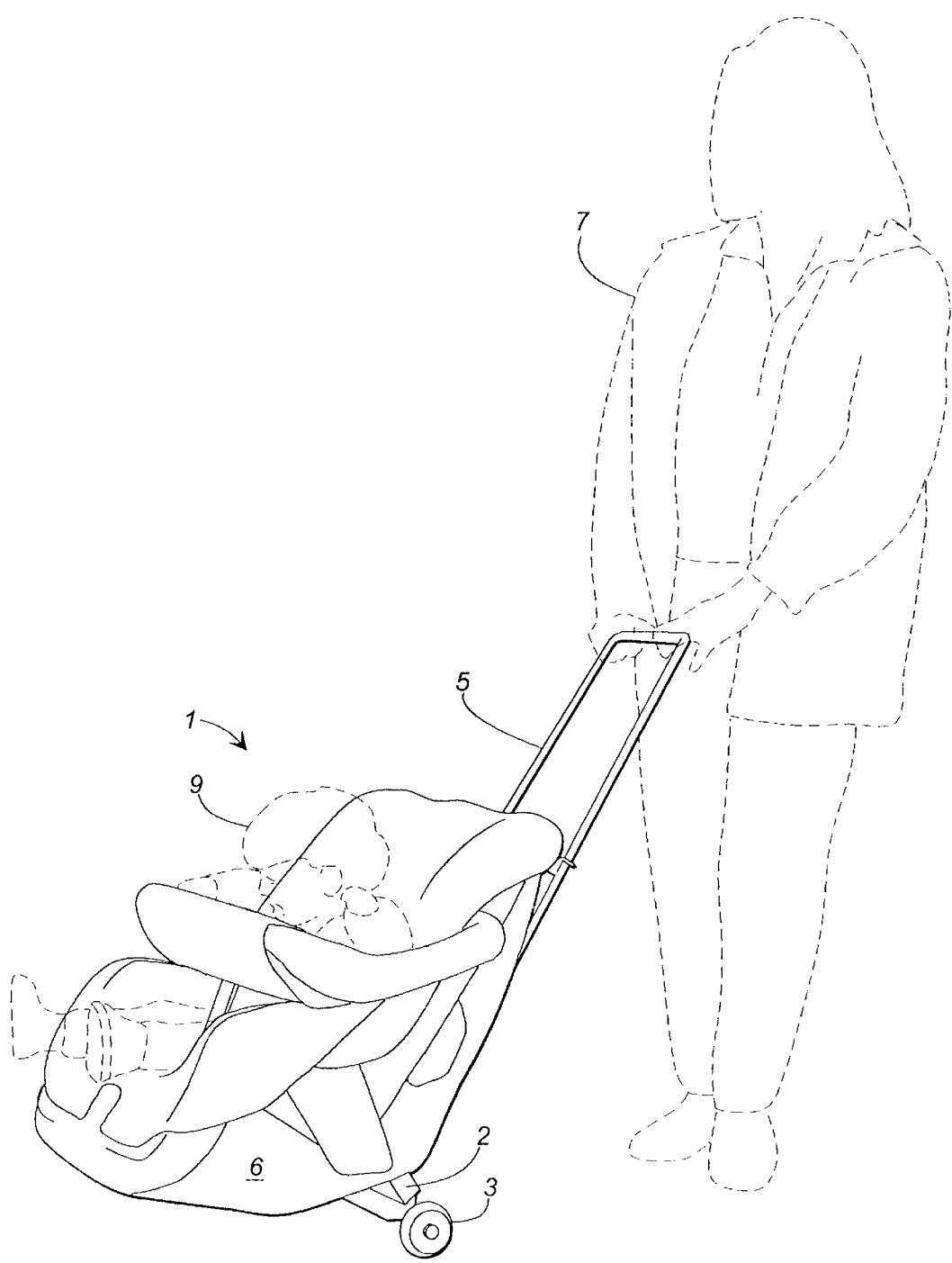
FIG. 1 illustrates the car seat and stroller assembly of the present invention when the assembly is operating in the stroller mode.

FIG. 1 illustrates the car seat stroller assembly 1 of the present invention in accordance with a first embodiment wherein the car seat stroller assembly 1 has been converted from a car seat into a stroller by extending a wheel assembly 2 having two wheels 3, only one of which is shown in FIG. 1, and by extending a handle assembly 5. FIG. 1 also illustrates a silhouette 7 of a woman pushing the car seat stroller assembly 1 in which a child 9 is secured. In accordance with this embodiment, a car seat which is sold by Century Products Company has been retrofitted by attaching the wheel assembly 2 and the handle assembly 5 of the present invention thereto.

Figure 2A:
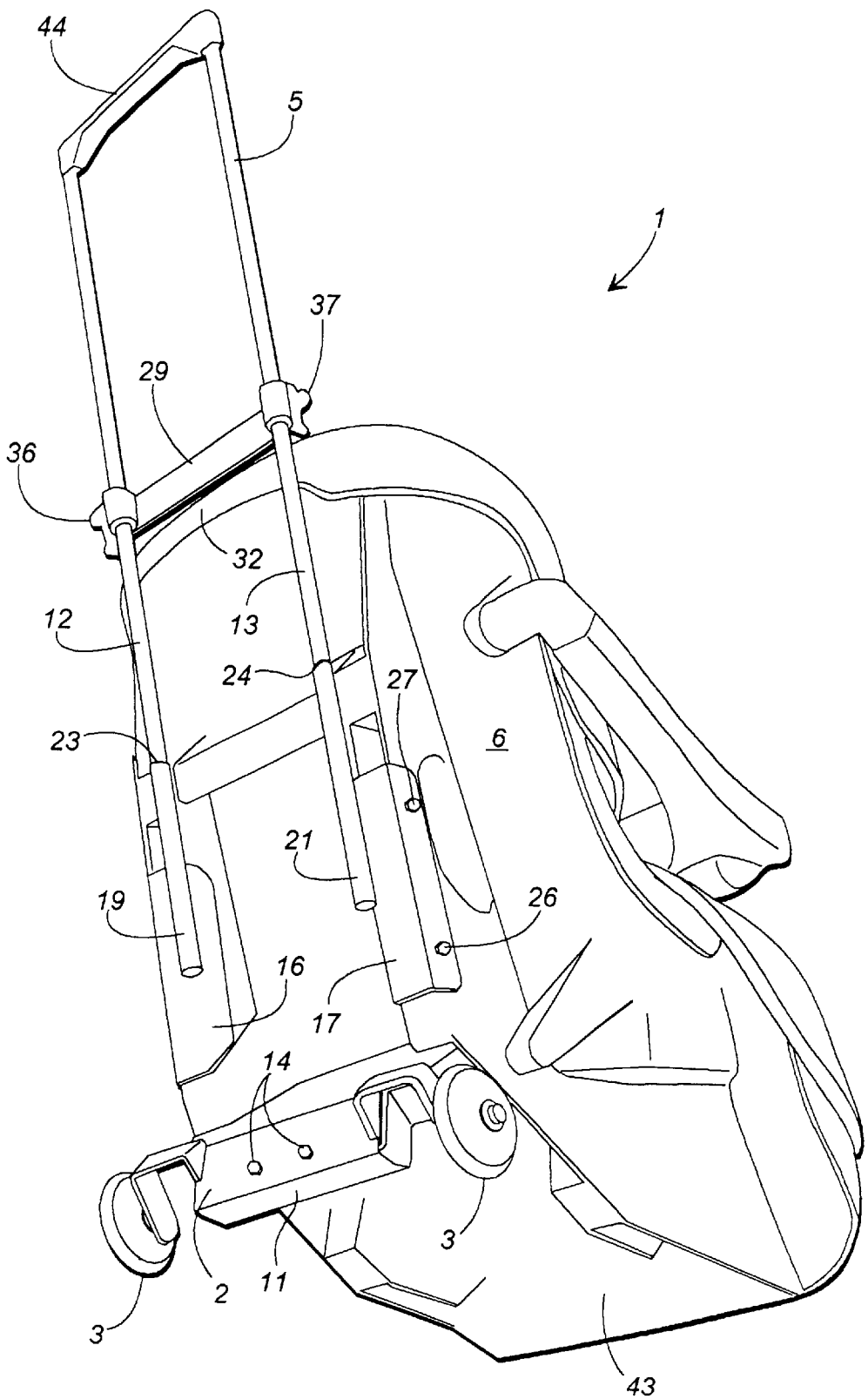
FIG. 2A is a rear perspective view of the car seat stroller assembly of the present invention in accordance with a first embodiment wherein the wheel assembly and the handle are in the extended positions so that the assembly can be operated in the stroller mode.

FIG. 2A illustrates a rear perspective view of the car seat stroller assembly 1 shown in FIG. 1 which illustrates the manner in which the wheel assembly 2 of the present invention is secured to the car seat body 6. The car seat sold by Century Products Company comprises an extension 11 which is intended to be inserted into an opening in the portion of the fixed automobile car seat (not shown) where the vertical backing member of the fixed automobile car seat abuts the horizontal seat member of the fixed automobile car seat. When the car seat body 6 is placed firmly against the fixed automobile car seat and the insert 11 is inserted between the vertical backing member and the horizontal seat member, the insertion member 11 assists in preventing movement of the car seat body 6.

The wheel assembly 2 is attached to the insertion member 11 via a fastening device 14, which may be, for example, screws, bolts, rivets, adhesives, etc. When the wheel assembly 2 is in the extended position, as shown in FIG. 2A, the wheels 3 extend below the bottom surface of the insertion member 11 so that when the wheels are in contact with the ground, they fully support the car seat 6. The insertion member 11 hinges about a horizontal axis (not shown) to allow it to be extended and retracted. When the wheel assembly 2 is in the extended position, the insertion member 11 to which the wheel assembly 2 is attached locks into place so that the wheels cannot retract when the car seat stroller assembly is operating in the stroller mode.

The car seat 6 is also retrofitted with a handle assembly 5 which comprises two vertical tube members 12 and 13, which preferably are telescoping tubes to enable the handle assembly 5 to be extended and retracted. The handle assembly 5 is attached to the car seat via brackets 16 and 17, which are fixedly attached to the car seat body 6, and by mating tube portions 19 and 21 which receive the ends of the vertical tube members 12 and 13 at openings 23 and 24 in the mating tube portions 19 and 21. The brackets 16 and 17 are secured to the body of the car seat 6 via an attachment mechanism such as, for example, bolts 26 and 27. A horizontal support member 29 secures the vertical tube members 12 and 13 to the upper portion of the back 32 of the car seat body 6 and prevents the vertical tube members 12 and 13 from substantial movement in the directions transverse to the axial directions of the vertical tube members 12 and 13.

When operating the car seat stroller assembly 1 in the stroller mode, mechanism comprised of locking members 36 and 37, which are attached to horizontal support member 29 provide a mechanism for releasing and locking the vertical tube members 12 and 13. In order to extend the handle, the locking members 36 and 37 are placed in the position parallel to the vertical tube members 12 and 13 and the user exerts an upward force on the handle 41. Once the vertical tube members 12 and 13 have been lifted to the desired vertical position, the locking mechanisms 36 and 37 are pushed down so that they are substantially transverse to the vertical tube members 12 and 13 and the vertical tube members 12 and 13 are thereby locked into place. It should be noted that different types and configurations of handles may be used with the car seat stroller of the present invention. Therefore, the present invention is not limited to use with any particular type of handle assembly.

The wheel assembly 2 is extended manually by simply pulling the insertion member 11 or one or more of the wheels 3 in a direction away from the bottom 43 of the seat body 6 to thereby rotate the wheel assembly 2 into the extended position. In order to retract the wheel assembly 2, the user simply pushes the wheel assembly 2 in a direction toward the bottom 43 of the car seat body 6. The insertion member 11 is known as the "Posilock" feature of the Century Products Company car seat.

It will be understood by those skilled in the art that the present invention is not limited to use with any particular type or brand of car seat The Century car seat was chosen in accordance with this embodiment due to the Posilock Feature, which makes the Century Products Company car seat very suitable for retrofitting with the wheel assembly 2 of the present invention. It will be understood by those skilled in the art that a wheel assembly identical or similar to the wheel assembly 2 shown in FIGS. 1 and 2A can be attached to the bottom and rear portion of any child car seat. However, it should be noted that, regardless of the car seat with which the retrofitting assembly of the present invention is implemented, it is important that the wheel assembly be attached to the bottom and rear portion of the car seat because this location allows the stroller to be pushed or pulled with a high degree of maneuverability.

Figure 2B:
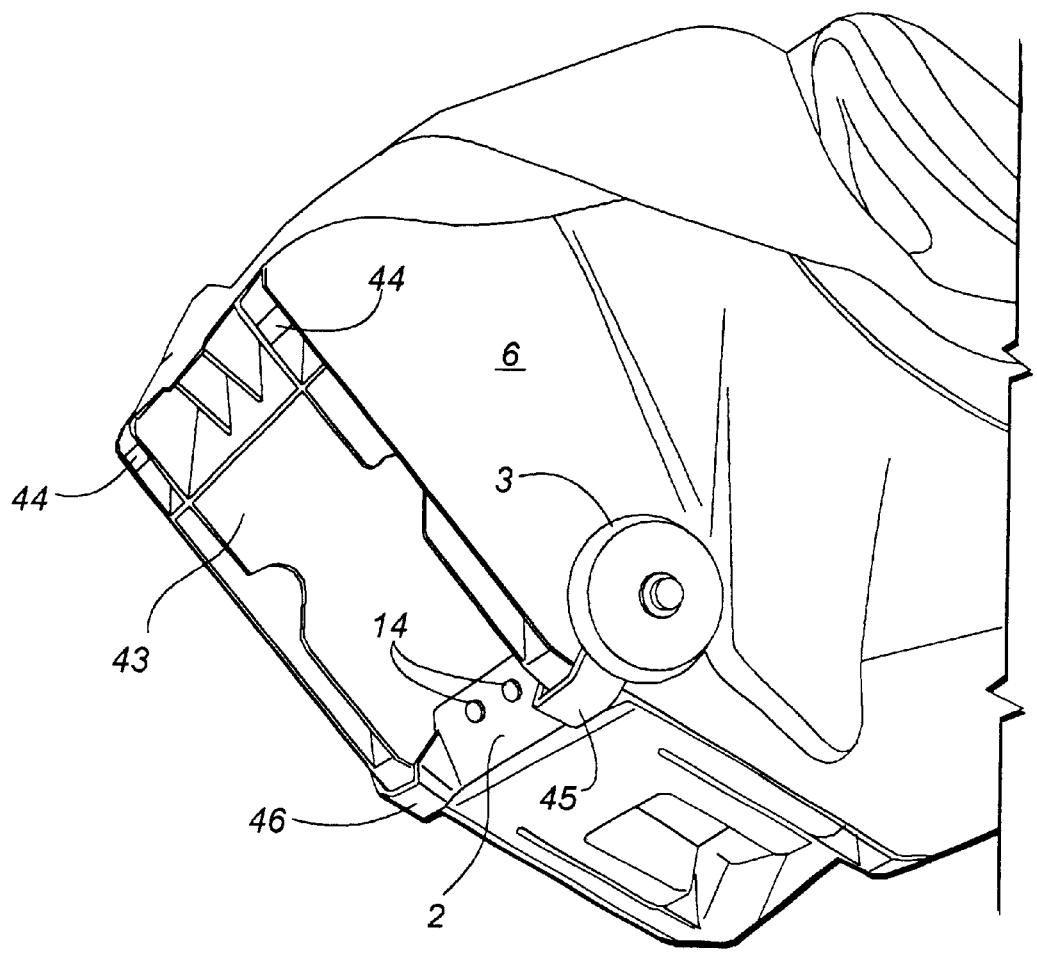
FIG. 2B is a bottom perspective view of the car seat stroller assembly of the present invention wherein the wheel assembly is retracted such that the car seat stroller assembly is in the car seat mode and can be attached to the fixed car seat of an automobile.

FIG. 2B is a bottom perspective view of the car seat stroller assembly 1 which illustrates the wheel assembly 2 in the retracted position. This view also illustrates the front brakes 44, which preferably are rubber blocks secured to the front, bottom portion of the car seat body 6. The brakes 44 prevent the bottom 43 of the car seat body 6 from being scratched when the front, bottom portion of the car seat body 6 is placed against the ground or floor. The brakes 44 allow the assembly to be securely placed at rest.

In the retracted position, the wheels 3 are flush against the body 6 of the car seat. Two substantially U-shaped support members 45 and 46 are shaped to engage square or rectangular-shaped sections on the body 6 of the seat. By using these U-shaped support members 45 and 46 to couple the wheels 3 with the wheel assembly 2, the wheels 3 are held snugly against the sides of the car seat body 6 and thus do not substantially extend beyond the sides of the car seat body 6 when the wheel assembly 2 is in the retracted position. This feature of the present invention enables the car seat stroller assembly 1 to be easily handled by a user when securing it to and removing it from the fixed automobile car seat (not shown). Furthermore, in the retracted position, the wheel assembly 2 and the wheels 3 slightly expand the effective base of the seat thereby providing it with additional lateral support when it is secured to the fixed automobile car seat.

Figure 3A:
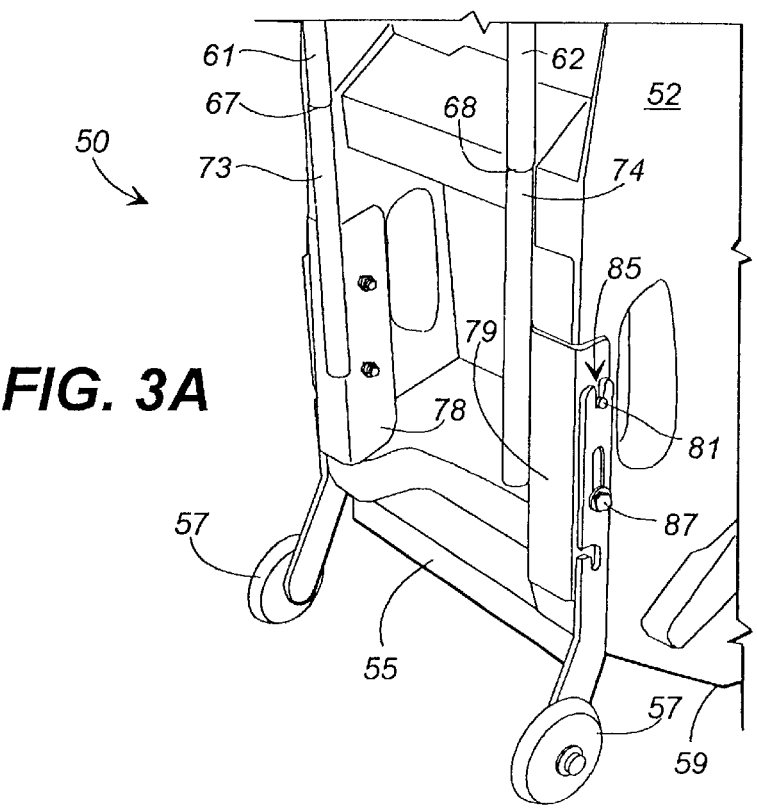
FIG. 3A illustrates the car seat stroller assembly of the present invention in accordance with the preferred embodiment wherein the wheel assembly is extended so that the car seat stroller assembly can be operated in the stroller mode.

FIG. 3A illustrates a cross-sectional rear perspective view of the car seat stroller assembly 50 of the present invention in accordance with a second embodiment. In accordance with this embodiment, when the wheel assembly 55 is in the extended position to place the car seat stroller assembly 50 in the stroller mode, the wheels 57 are disposed below the bottom surface 59 of the body 52 of the car seat 52. In this position, the wheel assembly 55 and the wheels 57 provide total vertical support for the car seat stroller assembly 50. The handle assembly used in this embodiment is substantially identical to the handle assembly 5 shown in FIGS. 1, 2A and 2B in that it comprises vertical tubular members 61 and 62, which preferably are telescoping tubular members, which fit into openings 67 and 68 in vertical tubular mating portions 73 and 74, respectively. The vertical tubular mating portions 73 and 74 are attached to brackets 78 and 79 by any suitable attachment means such as, for example, welding, bolts, rivets, etc.

When the car seat stroller assembly 50 is in the stroller mode, i.e., when the wheel assembly 55 is fully extended and locked into place, pins 81, which are secured to brackets 78 and 79, mate with a U-shaped slot 85. The U-shaped slot 85 is of sufficient length to prevent the possibility of the pin 81 coming out of the slot 85 when the car seat stroller assembly 1 is operational in the stroller mode. Also, a bolt and washer assembly 87 is sufficiently tight to maintain a constant amount of pressure and friction between the brackets 78 and 79 and the transverse members 89 of the wheel assembly 55.

Figure 3B:
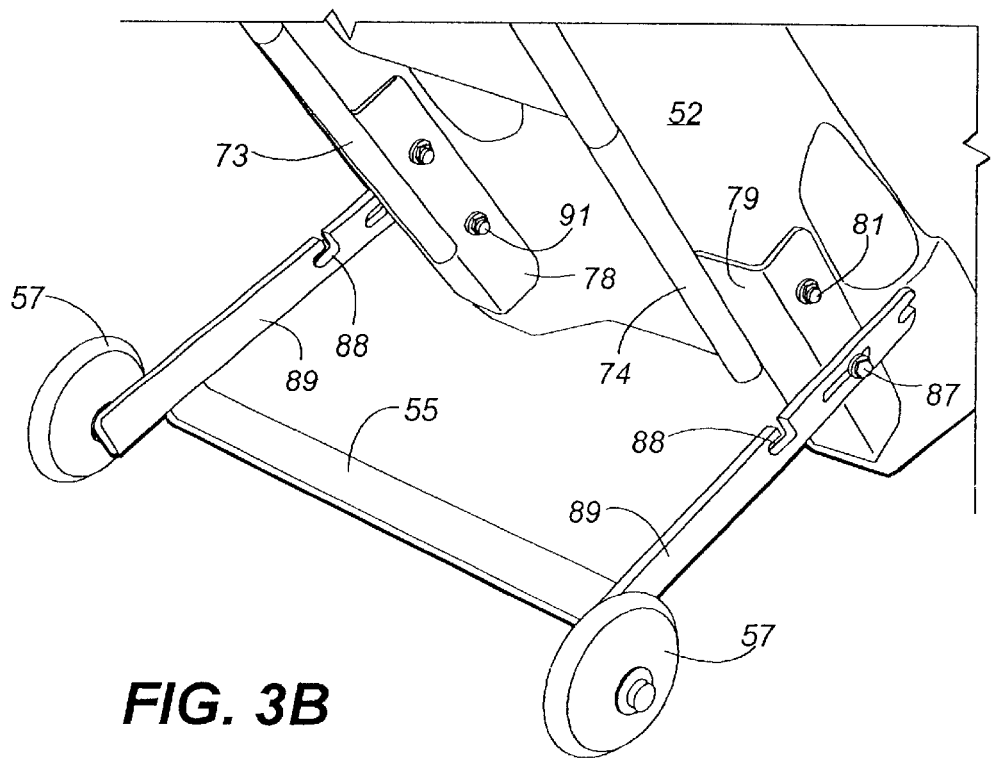
FIG. 3B illustrates the car seat stroller assembly in accordance with the preferred embodiment of the present invention shown in FIG. 4 when the wheel assembly is between the fully extended and fully retracted positions.

FIG. 3B illustrates the car seat stroller assembly 50 with the wheel assembly 55 partially retracted, i.e., between the fully-extended and fully-retracted positions. In order to retract the wheel assembly 55, the user simply lifts the body 52 of the car seat assembly 50 so that the pin 81 is moved in an upward direction until it is out of the slot 85 and then the wheel assembly 55 is folded in an upward direction until the pins 81 are received in the slots 88 of the transverse members 89 of the wheel assembly 55. The slots 88 are L-shaped so that once the pins 81 have been received in the slots 88, the pins 81 are moved vertically relative to the slots 88 until the pins 81 abut the ends of the slots 88 closest to the wheels 57. The mating of pins 81 with the slots 88 substantially prevents lateral and vertical movement of the pins 81 within the slots 88 when the wheel assembly 55 is in the retracted position. Any movement of the wheel assembly 55 when it is in the retracted position is prevented by the friction fit created by the bolt and nut assembly 87 and 91.

When the wheel assembly 55 is in the fully-retracted position (not shown), the wheels 57 are disposed against the sides of the car seat body 52 and are completely unobtrusive. By closely adapting the wheel assembly 55 to the shape of the car seat body 52, the car seat stroller assembly 50 can be easily handled by the user when the user is placing the assembly in and removing the assembly from the vehicle.

Figure 4A:
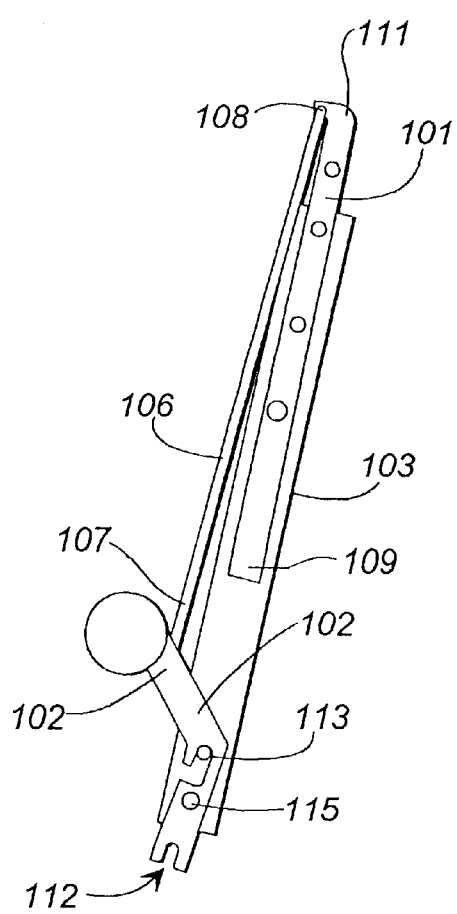
FIGS. 4A and 4B illustrates the wheel and handle assembly of the car seat stroller assembly of the present invention shown in FIGS. 3A and 3B which demonstrates the manner in which the handle and wheel assemblies operate in conjunction with one another to cause the handle assembly to be extended as the wheel assembly is extended and to cause the handle assembly to be folded as the wheel assembly is retracted.
Figure 4B:
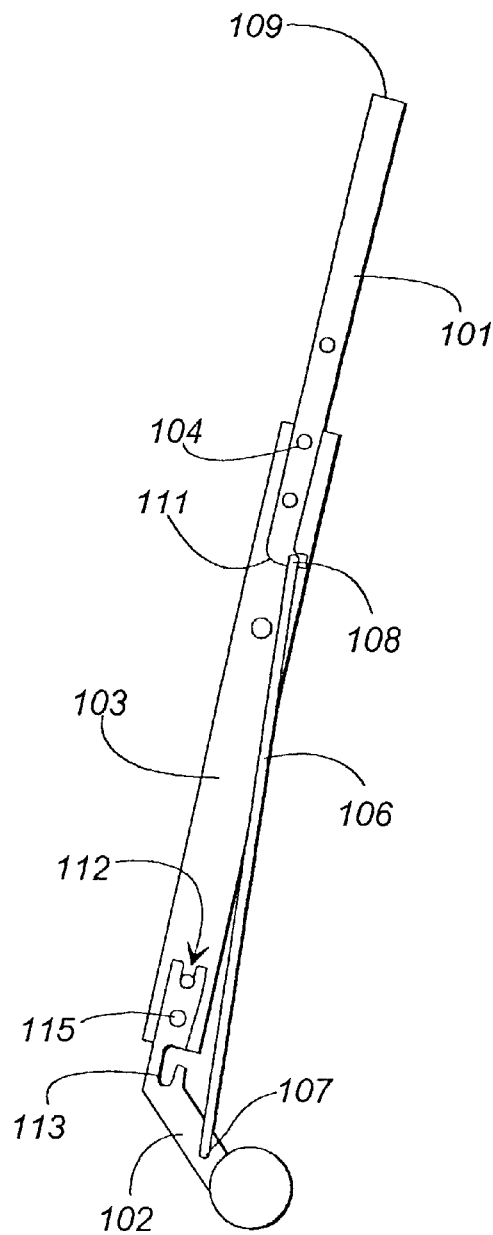

FIGS. 4A and 4B illustrate the wheel and handle assembly of the present invention in accordance with the preferred embodiment. In accordance with this embodiment, the wheel assembly and handle assembly are linked together in such a manner that retraction of the handle effectuates retraction of the wheel assembly and extension of the handle assembly effectuates extension of the wheel assembly. The handle assembly 101 is pivotally attached on each end thereof to a linking member 103 by a fastening device 104. The fastening device 104 allows rotational movement of the handle assembly 101 with respect to the linking member 103 while also securing them together. Those skilled in the art will note that this rotational arrangement can be achieved in a plurality of different ways which are well known to those skilled in the art.

A linking member 106 is rotationally secured on one end 107 to the wheel assembly 102 and on the other end 108 to the handle assembly 101. FIG. 4A illustrates the handle assembly 101, the linking member 103 and the wheel assembly 102 when the handle and wheel assemblies 101 and 102 are in the retracted positions. When the portion 109 of the handle assembly 101 intended to be gripped by the user is rotated in a clockwise and downward direction toward the wheel assembly 102, the lower end 111 of the handle assembly 101 is rotated upwards away from the wheel assembly 102 thereby exerting an upward force on the end 108 of the linking member 106. This upward force exerts an upward force on the end 107 of the linking member 106 which, in turn, causes the wheel assembly 102 to be pulled into the retracted position shown in FIG. 4A.

Conversely, when the wheel assembly 102 is in the fully-retracted position and the end 109 of the handle assembly 101 is rotated upwards in the counter-clockwise direction away from the wheel assembly 102, the end 111 of the handle assembly 101 is rotated in the downwards in the counterclockwise direction toward the wheel assembly 102. This causes a downward force to be exerted on the end 108 of the linking member 106 which, in turn, causes a downward force to be exerted on the end 107 of the linking member 106, thus causing the wheel assembly 102 to be rotated in the downward direction until it is fully extended, as shown in FIG. 4B.

As with the embodiments shown in FIGS. 2A–3B, in the embodiment shown in FIGS. 4A and 4B, the wheel assembly 102 contains slots 112 and 113, which serve identical functions to that of the slots 85 and 88 shown in FIGS. 3A and 3B. Also, a nut and bolt arrangement 115 is utilized in the embodiment shown in FIGS. 4A and 4B in the same manner in which the nut and bolt assembly 87 and 91 is utilized in the embodiment shown in FIGS. 3A and 3B to secure the wheel assembly 55 in place.

It will be understood by those skilled in the art that the present invention is not limited to the particular embodiments discussed above with respect to FIGS. 1–4B. Those skilled in the art will understand that the present invention is not limited to any particular type of arrangement or configuration for the handle and wheel assemblies implemented with the car seat stroller assembly of the present invention. The embodiments discussed above are intended to demonstrate the various advantageous features of the present invention, but those skilled in the art will understand that the invention is not limited to these particular features. Those skilled in the art will understand that other modifications, deletions and adaptations can be made to the embodiments discussed above which are all within the scope of the present invention.

What is claimed is:

1. A car seat stroller assembly which is convertible between a child car seat and a child stroller, the car seat stroller assembly comprising:
    a child car seat adapted to be removably secured to a fixed car seat of an automobile, the child car seat comprising a seat body, the seat body having a bottom portion and a back portion, the bottom portion having a front end and a rear end, the back portion having a top end and a bottom end, the bottom end of the back portion being connected to the rear end of the bottom portion;
    a wheel assembly pivotally secured to the seat body at a location near the rear end of the bottom portion of the seat body and near the bottom end of the back portion of the seat body, wherein the wheel assembly comprises two side members, each side member having a first end and a second end, wheels are rotatably mounted on each of the first ends of the two side members,
    when the wheel assembly is converted into an extended position, a first notch formed in each of the second ends of the side members engages a respective pin secured to sides of the seat body to thereby prevent the wheel assembly from movement in a direction toward the wheels and in a direction away from the bottom end of the back portion,
    when the wheel assembly is converted into a retracted position, a second notch formed in each of the side members at a location between the wheels and the first notches engages said respective pins to prevent the wheel assembly from movement in a direction away from the back portion of the seat body, wherein when the wheel assembly is in the retracted position, the wheels are located near the top end of the back portion of the seat body; and
    a handle assembly secured to the seat body at a location along the back portion of the seat body.

2. The car seat stroller assembly of claim 1, wherein the wheel assembly consists of two wheels.

3. The apparatus of claim 2, wherein the wheel assembly can be extended from the retracted position into an extended position in which the wheels extend below the bottom portion of the seat body to enable the car seat stroller assembly to be operated as a child stroller.

4. The car seat stroller assembly of claim 1, wherein the handle assembly is linked to the wheel assembly by a linkage in such a way that when the handle assembly is extended, the wheel assembly is extended until said respective pins are engaged in the first notches.

5. The car seat stroller assembly of claim 4, wherein when a user lifts the seat body in an upwards direction away from the wheels, and when the handle assembly is retracted, the linkage causes the wheel assembly to be retracted until said respective pins are engaged in the notches formed in the first sides of the side members.

* * * * *